United States Patent
Nakayama (10) Patent No.: US 8,767,577 B2
(45) Date of Patent: Jul. 1, 2014

(54) RADIO BASE STATION AND COMMUNICATION CONTROL METHOD

(75) Inventor: Taku Nakayama, Kanagawa (JP)

(73) Assignee: KYOCERA Corporation, Kyoto (JP)

(*) Notice: Subject to any disclaimer, the term of this patent is extended or adjusted under 35 U.S.C. 154(b) by 78 days.

(21) Appl. No.: 13/320,126

(22) PCT Filed: May 12, 2010

(86) PCT No.: PCT/JP2010/058068
§ 371 (c)(1),
(2), (4) Date: Nov. 11, 2011

(87) PCT Pub. No.: WO2010/131688
PCT Pub. Date: Nov. 18, 2010

(65) Prior Publication Data
US 2012/0057500 A1    Mar. 8, 2012

(30) Foreign Application Priority Data
May 13, 2009  (JP) .................. 2009-117076

(51) Int. Cl.
*H04W 4/00*    (2009.01)
*H04M 11/00*    (2006.01)

(52) U.S. Cl.
USPC .................. 370/252; 370/329; 455/405

(58) Field of Classification Search
USPC .......... 370/230, 252, 328, 331, 329; 455/405, 455/406, 452.2, 501, 507, 509
See application file for complete search history.

(56) References Cited

U.S. PATENT DOCUMENTS

| 7,634,278 B2* | 12/2009 | Takayanagi et al. ........ 455/452.2 |
| 2010/0103817 A1* | 4/2010 | Takayanagi et al. .......... 370/230 |
| 2010/0118731 A1* | 5/2010 | Koyanagi ...................... 370/252 |
| 2010/0189045 A1* | 7/2010 | Takeshita et al. ............. 370/329 |
| 2010/0322073 A1* | 12/2010 | Namba et al. ................. 370/235 |

FOREIGN PATENT DOCUMENTS

WO    WO2009/016749    *   2/2009    ............... H04Q 7/22

OTHER PUBLICATIONS

Evolved Universal Terrestrial Radio Access (E-ULTRA); Physical layer procedures (Release *8), 3GPP TS 36.213 V8.6.0, 2009.03, passage 7.2 to 7.2.3.
Evolved Universal Terrestrial Radio Access (E-ULTRA); Physical layer procedures (Release *8), 3GPP TS 36.213 V8.4.0, 2008.09.
A. Nishio et al., "Adaptive transmission techniques for control signaling in 3G-LTE", Panasonic Technical Journal, Apr. 15, 2009, vol. 55, No. 1, pp. 15 to 20, passage 4.2.
International Search Report; PCT/JP2010/058068; Jun. 8, 2010.

* cited by examiner

*Primary Examiner* — Habte Mered
*Assistant Examiner* — Prince A Mensah
(74) *Attorney, Agent, or Firm* — Studebaker & Brackett PC (57) ABSTRACT

A control unit (102) in a radio base station (1A) receives a measurement W-CQI message from a radio terminal (2A) and acquires the usage rate of the PDCCH corresponding to the serving sector. Further, the control unit (102) in the radio base station (1A) multiplies the measurement W-CQI corresponding to the serving sector by the reciprocal of the usage rate of the PDCCH corresponding to the radio base station (1A), and thereby estimates the SINR of the PDCCH corresponding to the serving sector at the radio terminal (2A).

4 Claims, 11 Drawing Sheets

| OFDM SYMBOL NUMBER OF PDCCH | 1 | 2 | 3 |
|---|---|---|---|
| OFFSET VALUE[dB] | 0.7307 | 1.8562 | 2.1911 |

FIG. 8

RADIO BASE STATION AND COMMUNICATION CONTROL METHOD

TECHNICAL FIELD

The present invention relates to a radio base station in a radio communication system, and to a communication control method for the radio base station, in which the minimum assignment unit of a downlink channel with respect to a radio terminal includes a user data channel and a control channel having the same frequency.

BACKGROUND ART

In recent years, ongoing increase to capacity and speed is required in response to implementation of broad band to mobile communication services. As a result, third generation mobile communication systems such as W-CDMA (Wideband Code Division Multiple Access) or next-generation mobile communication systems in substitution for 3.5th generation mobile communication systems are being implemented globally. Assignment has commenced within Japan in relation to frequencies for 3.9th generation mobile communication systems that represent the mobile communication system for association with fourth generation mobile communication systems. LTE (Long Term Evolution) is a type of 3.9th generation mobile communication system that is considered to embody the most effective standard for association with fourth generation mobile communication systems.

In LTE, OFDMA (Orthogonal Frequency Division Multiplexing Access) is used in relation to downlink communication from a radio base station to a radio terminal. Furthermore, SC-FDMA (Single Carrier Frequency Division Multiple Access) is used in relation to uplink communication from a radio terminal to a radio base station. These multiplexing schemes realize multiplexing for users by allocation of two-dimensional radio resources embodied by frequency and time.

The downlink radio resources are divided into units termed resource blocks (RB). RB includes PDCCH (Physical Downlink Control CHannel) for transmission of downlink control information and PDSCH (Physical Downlink Shared CHannel) for transmission of downlink user data.

CITATION LIST

Non-Patent Literature

Non Patent Literature 1; 3GPP TS 36.213 V8 4.0 "Technical Specification Group Radio Access Network; Evolved Universal Terrestrial Radio Access (E-UTRA); Physical Layer procedures (Release 8)"

SUMMARY OF THE INVENTION

Realization of enhanced speed and capacity in the context of LTE requires efficient usage of extremely high frequencies in comparison to conventional third generation mobile communications systems or 3.5th generation mobile communication systems. In order to realize these requirements in LTE, operation is envisaged by use of the same frequency for nearby cells or sectors. However use of this type of operation entails the problem of interference to a given cell or sector from another cell or another sector.

Consequently, the radio base station requires downlink communication control to comprehend the PDSCH or the PDCCH quality received by the radio terminal so that the quality thereby satisfies a required level. Control information required for the radio terminal to receive PDSCH is contained in information transmitted by the PDCCH. Therefore, the radio terminal must enable normal reception of information transmitted by the PDCCH. For that purpose, the radio base station must control downlink communication so that the PDCCH quality received by the radio terminal satisfies a required level.

However, in the LTE standard, the radio terminal only transmits information indicating the PDSCH reception quality to the radio base station, and does not transmit information indicating the PDCCH reception quality. Consequently, the radio base station must make a suitable estimation of the PDCCH quality received by the radio terminal using information that indicates the PDSCH reception quality received from the radio terminal.

Therefore, it is an object of the present invention to provide a radio base station and a communication control method enabling suitable estimation of a radio resource quality.

To solve the above problems, the present invention includes the following characteristics. Firstly, a first feature of the present invention is summarized as a radio base station (radio base station 1A) in a radio communication system (radio communication system 10) in which the minimum assignment unit of a downlink resource toward a radio terminal (radio terminal 2A) includes a user data channel (PCSCH) and a control channel (PDCCH) of the same frequency, comprising: a first acquisition unit (W-CQI reception processing unit 152) configured to acquire a reception quality of the user data channel in the radio terminal corresponding to a predetermined cell or predetermined sector, a second acquisition unit (PDCCH usage rate acquisition unit 154, PDCCH quality estimation unit 154) configured to acquire a value determined according to a usage rate of the control channel corresponding to a cell other than the predetermined cell or a sector other than the predetermined sector, and an estimation unit (PDCCH quality estimation unit 156) configured to estimate a reception quality of the control channel corresponding to the predetermined cell or the predetermined sector in the radio terminal based on the communication quality of the user data channel corresponding to the predetermined cell or the predetermined sector acquired by the first acquisition unit and the value determined according to the usage rate of the control channel corresponding to the other cell or the other sector acquired by the second acquisition unit.

The radio base station estimates the reception quality of the control channel corresponding to the predetermined cell or the predetermined sector in the radio terminal based on the value determined from the communication quality of the user data channel corresponding to the predetermined cell or the predetermined sector and the usage rate of the control channel corresponding to the other cell or the other sector acquired by the second acquisition unit.

That is to say, although the radio base station estimates the reception quality of the control channel that is not notified by the radio terminal based on the communication quality of the user data channel corresponding to the predetermined cell or the predetermined sector, the reception quality of the control channel can be suitably estimated by considering the usage rate of the control channel at that time.

A second feature of the present invention is summarized as that the estimation unit estimates the reception quality of the control channel corresponding to the predetermined cell or the predetermined sector in the radio terminal by multiplying the reception quality of the user data channel corresponding to the predetermined cell or the predetermined sector by the reciprocal of the usage rate of the control channel corresponding to the other cell or the other sector.

A third feature of the present invention is summarized as that the estimation unit uses a usage rate of the user data channel corresponding to the predetermined cell or the predetermined sector as the usage rate of the user data channel corresponding to the other cell or the other sector.

A fourth feature of the present invention is summarized as that the second acquisition unit acquires an offset value being the difference between the reception quality of the control channel corresponding to the predetermined cell or the predetermined sector and the reception quality of the user data channel corresponding to the predetermined cell or the predetermined sector in the radio terminal, and the estimation unit estimates the reception quality of the control channel corresponding to the predetermined cell or the predetermined sector in the radio terminal by adding the offset value and the reception quality of the user data channel corresponding to the predetermined cell or the predetermined sector.

A fifth feature of the present invention is summarized as that the offset value increases as the number of symbols configuring a control channel domain corresponding to the predetermined cell or the predetermined sector increases.

A sixth feature of the present invention is summarized as to a communication control method for a radio base station in a radio communication system in which the minimum assignment unit of a downlink radio resource toward a radio terminal includes a user data channel and a control channel of the same frequency, the communication control method comprising the steps of: acquiring a reception quality of the user data channel in the radio terminal corresponding to a predetermined cell or predetermined sector, acquiring a value determined according to a usage rate of the control channel corresponding to a cell other than the predetermined cell or a sector other than the predetermined sector, and estimating a reception quality of the control channel received by the radio terminal corresponding to the predetermined cell or the predetermined sector based on the acquired communication quality of the user data channel corresponding to the predetermined cell or the predetermined sector and the acquired value determined according to the usage rate of the control channel corresponding to the other cell or the other sector.

The present invention enables suitable estimation of a radio resource quality.

BEST MODES FOR CARRYING OUT THE INVENTION

Next, with reference to drawings, the embodiment according to the present invention will be described. More specifically, (1) Configuration of Radio Communication System, (2) Operation of Radio Base Station, (3) Operation and Effect, and (4) Other Embodiments will be described. The disclosure of the drawings in relation to the following embodiments uses the same or similar reference numerals in relation to the same or similar portion.

Figure 1:
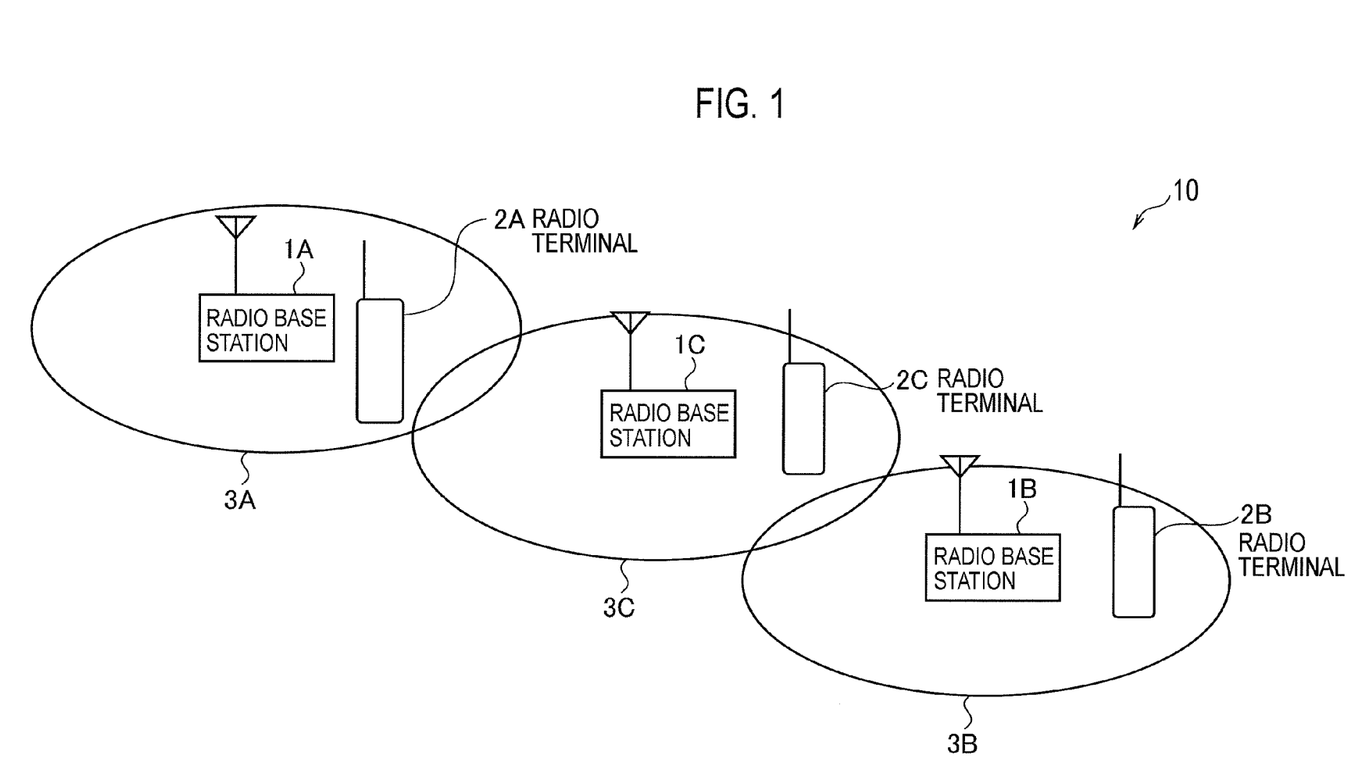
FIG. 1 is a diagram showing the entire schematic configuration of a radio communication system according to an embodiment of the present invention.

(1) Configuration of Radio Communication System (1.1) Overall Schematic Configuration of Radio Communication System FIG. 1 is a diagram showing the entire schematic configuration of a radio communication system 10 according to an embodiment of the present invention.

The radio communication system 10 illustrated in FIG. 1 has a configuration based on LTE (Long Term Evolution) standardized with reference to 3GPP. The radio communication system 10 includes a radio base station 1A, a radio base station 1B, and a radio base station 1C, and a radio terminal 2A, a radio terminal 2B, and a radio terminal 2C. In FIG. 1, the radio terminal 2A is disposed in a cell 3A provided in the radio base station 1A. The radio terminal 2B is disposed in a cell 3B provided in the radio base station 1B. The radio terminal 2C is disposed in a cell 3C provided in the radio base station 1C. The cells 3A to 3C are divided into a plurality of sectors (not illustrated).

The radio base station 1A executes communication with the radio terminal 2A. The radio base station 1B executes communication with the radio terminal 2B. The radio base station 1C executes communication with the radio terminal 2C.

(1.2) Configuration of Radio Base Station

Figure 2:
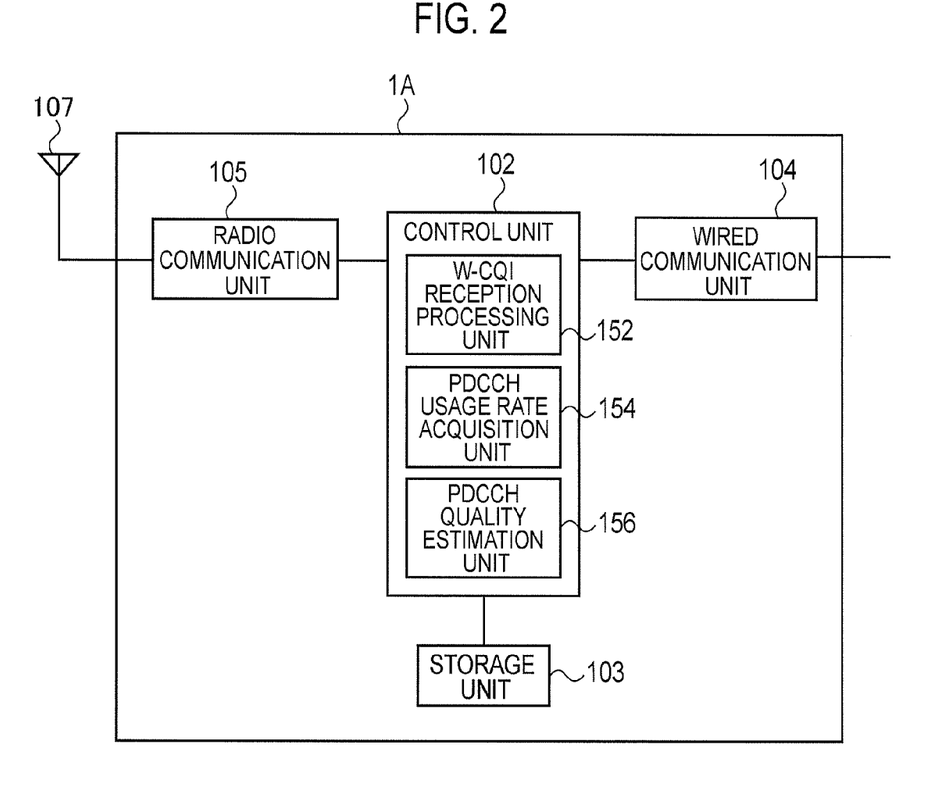
FIG. 2 is a diagram illustrating the configuration of a radio base station according to the embodiment of the present invention.

FIG. 2 is a diagram illustrating the configuration of a radio base station 1A. The radio base station 1A illustrated in FIG. 2 includes a control unit 102, a storage unit 103, a wired communication unit 104, a radio communication unit 105, and an antenna 107. The radio base station 1B and the radio base station 1C have the same configuration as the radio base station 1A.

The control unit 102 is configured, for example, by CPU, and controls each function provided in the radio base station 1A. The storage unit 103 is configured, for example, by a memory, and stores various types of information used in control and the like in the radio base station 1A. The wired communication unit 104 is connected to an access gateway or the like provided on an upper network via a router or the like (not shown).

The radio communication unit 105 receives a radio signal via the antenna 107 from the radio terminal 2A and transmits a radio signal to the radio terminal 2A.

Next, the specific control executed by the control unit 102 will be described. The control unit 102 assigns one or a plurality of resource blocks (RB), representing a downlink radio resource, to the radio terminal 2A according to the channel quality required by the radio terminal 2A in a predetermined sector (hereinafter referred to as "serving sector") that configures the cell 3A of the radio base station 1A. The RB includes the control information channel (PDCCH) and the shared channel (PDSCH). The PDCCH domain is a maximum of three OFDM symbols from the head of the RB, and the PDSCH domain is the OFDM symbol that continues to the PDCCH. In the present embodiment, the RB to be assigned continues the frequency band.

The channel quality required by each radio terminal in the serving sector differs. The control unit 102 sets and assigns the RB to be the subject of assignment to the radio terminal and the number of RBs according to the channel quality required by each radio terminal. More specifically, the control unit 102 assigns the PDCCH and the PDSCH in the RB for each radio terminal in the serving sector. The control unit 102 sets a communication method such as MIMO (Multiple-Input Multiple-Output), the retransmission number, the encoding ratio, and the modulation scheme according to the channel quality required by each radio terminal.

Assignment of the PDCCH and the PDSCH will be described in detail below.

Figure 3:
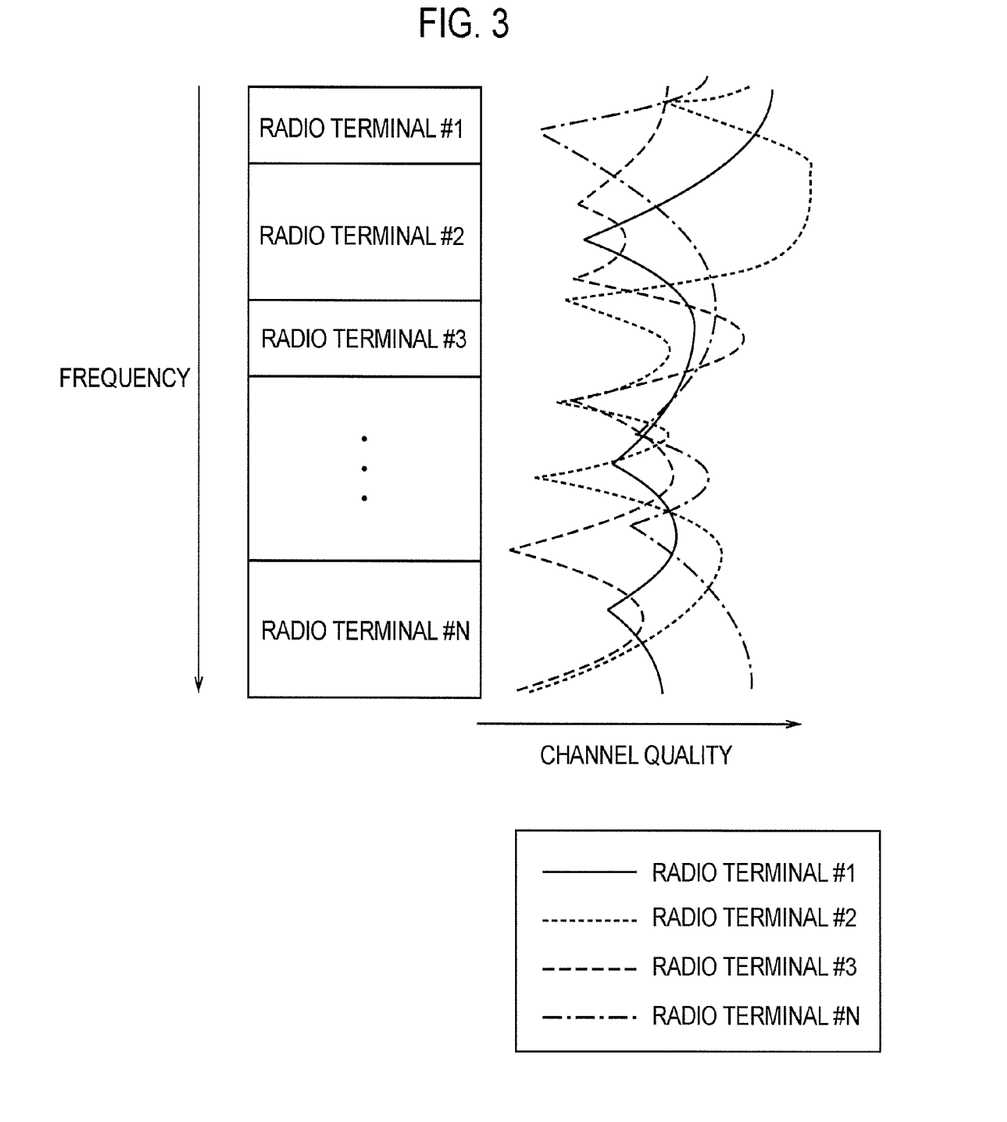
FIG. 3 is a diagram illustrating an example of PDSCH assignment by a radio base station according to the embodiment of the present invention.

FIG. 3 is a diagram illustrating an example of PDSCH assignment. FIG. 3 is a diagram illustrating an example in which the radio terminal 2A in the serving sector is a plurality of radio terminals #1 to #N. In FIG. 3, the control unit 102 assigns the PDSCH to the radio terminal #1 that is present in the serving sector. The PDSCH corresponds to the frequency band in which the channel quality is at least of the level required by the radio terminal #1.

The control unit 102 assigns the PDSCH to the radio terminals #2 to #N that are present in the serving sector. The PDSCH corresponds to the frequency band in which the channel quality is at least of the level required by the radio terminals #2 to #N.

The PDCCH includes information required for the radio terminal to receive the user data that is included in the PDSCH. Consequently, when information in the PDCCH cannot be received, the radio terminal cannot receive the user data in the PDSCH. Therefore, more specifically, the PDCCH includes various types of control information in the downlink radio resource or the DCI (Downlink Control Information) for each radio terminal. DCI corresponding to the plurality of radio terminals can be contained in the PDCCH in a single TTI (Transmission Time Interval).

The number of repetitions when DCI corresponding to one radio terminal is repeatedly contained in PDCCH in one TTI is called Aggregation Level (AL).

The control unit 102 determines the AL for the DCI of each radio terminal. The control unit 102 controls the encoding ratio by controlling the AL to each radio terminal. However, as described below, the PDCCH domain is a maximum of three OFDM symbols from the head of the RB. As a result, when AL is high, or in other words, as the number of DCI repetitions increases, the number of radio terminals corresponding to the DCI that can be contained in the PDCCH in a single TTI decreases. That is to say, there is a tradeoff between AL and the number of radio terminals corresponding to the DCI that can be contained in the PDCCH in a single TTI.

Furthermore, as the number of OFDM symbols corresponding to the PDCCH domain increases, although the number of radio terminals corresponding to the DCI that can be contained in the PDCCH in a single TTI increases, the decrease in the OFDM symbols corresponding to the PDSCH domain causes a reduction in the PDSCH encoding ratio. As a result, there is a tradeoff between AL and the PDSCH reception performance.

Figure 4:
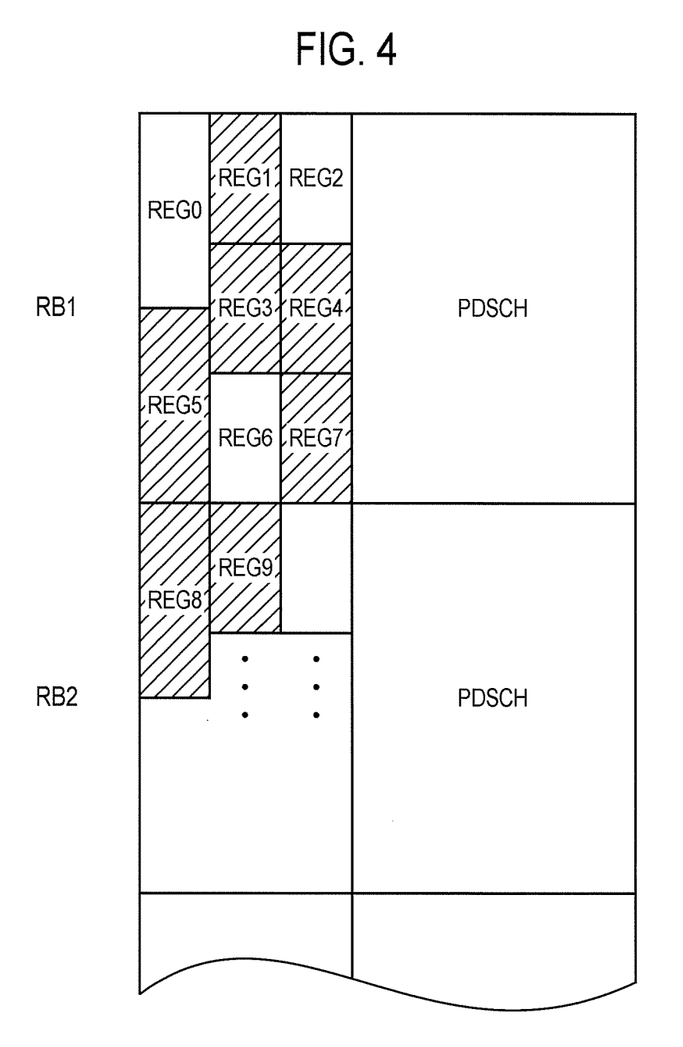
FIG. 4 is a diagram illustrating an example of REG assignment in the PDCCH by a radio base station according to the embodiment of the present invention.

The control unit 102 assigns REG (Resource Element Group) in the PDCCH to the radio terminal. FIG. 4 is a diagram illustrating an example of REG assignment in the PDCCH.

The control unit 102 firstly executes error correction coding for each DCI, and arranges in a one-dimensional domain the DCI that are repeated only a number of times corresponding to AL. Then, the control unit 102 selects the DCI containing position in the one-dimensional domain from the candidates determined pseudo-randomly by a unique value associated with the DCI. The unique value associated with the DCI, for example, is the RNTI or AL of the corresponding radio terminal. This process is executed in relation to all DCI. In this case, the one-dimensional domains without a DCI assignment remain in a state without information. Next, the control unit 102 divides the domain in the OFDM symbol acting as a PDCCH domain into REG. The control unit 102 contains items subjected to an interleave process using a unit of 8 bits of a bit sequence in the one-dimensional domain into REG corresponding to the assignment position in sequence from REG associated with a low frequency. In this manner, since DCI is stored pseudo-randomly in REG unit in the PDCCH, a frequency diversity effect is obtained.

(1.3) Estimation of PDCCH Quality by Radio Base Station

In the present embodiment, the control unit 102 estimates the PDCCH quality corresponding to the serving sector in advance of RB assignment to the radio terminal 2A.

Figure 5:
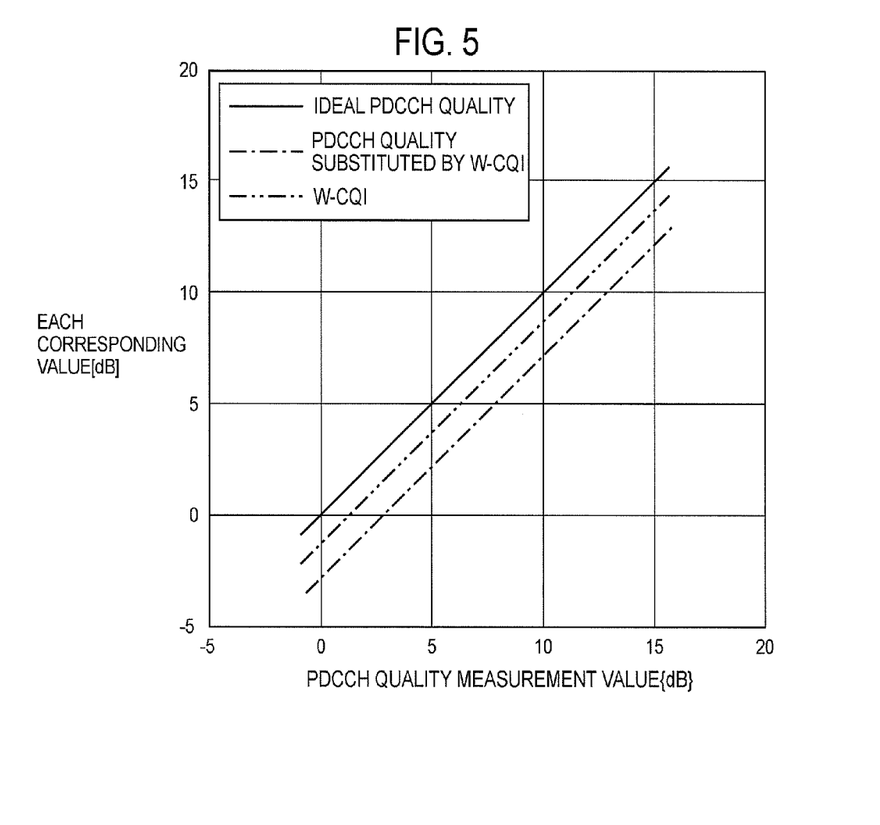
FIG. 5 is a graph illustrating the correspondence relationship among W-CQI, the PDCCH quality substituted by W-CQI, and the ideal PDCCH quality according to the embodiment of the present invention.

FIG. 5 is a graph illustrating the correspondence relationship among the ideal quality for the PDCCH corresponding to the serving sector (the ideal PDCCH quality), W-CQI measured by the radio terminal 2A (measured W-CQI) taken as the PDCCH quality (PDCCH quality substituted by W-CQI) and W-CQI corresponding to the serving sector.

As illustrated in FIG. 5, the PDCCH quality substituted by W-CQI used as the PDCCH corresponding to the serving sector conventionally is initially a value smaller than the ideal PDCCH quality by an order of 2[dB]. In the present embodiment, the estimation value for the PDCCH quality corresponding to the serving sector is closer to the ideal PDCCH quality than the PDCCH quality substituted by W-CQI. In FIG. 5, the PDCCH quality substituted by W-CQI is lower than W-CQI. This is due to the effect of rounding down fractions when quantifying the conversion from SINR to CQI.

A model for PDCCH interference required in relation to the PDCCH quality estimation for the serving sector will be described below.

In the PDSCH corresponding to the serving sector, interference is caused by the power of the PDCCH corresponding to another sector that has the same frequency band as the serving sector. The interference power received by way of the PDSCH in the i-th RB (RBi) in the j-th other sector by the PDSCH in the i-th RB corresponding to the serving sector can be represented in Equation (1) below with respect to the case, when the i-th RB in the j-th other sector is not used (Not Usage $RB_i$ at Sector) and when it is used (Usage $RB_i$ at $Sector_j$). In this case, when the PDSCH transmission power corresponding to the j-th other sector is denoted as $TxPower_j$, and the PDSCH transmission loss power corresponding to the j-th other sector is denoted as $Pathloss_j$,

[Equation 1]

$$I_{i,j} = \begin{cases} 0: & \text{Not Usage } RB_i \text{ at } Sector_j \\ TxPower_j - PathLoss_j: & \text{Usage } RB_i \text{ at } Sector_j \end{cases} \quad (1)$$

When Equation (1) and the channel power (ChannelPower$_{i,j}$) corresponding to the i-th RB ($RB_i$) in the j-th other sector are used, the PDCCH interference power $I_i$ corresponding to the serving sector that is the cause of the i-th RB ($RB_i$) in all other sectors is given by Equation (2) below.

[Equation 2]

$$I_i \sum_{j \ne ServingSector}^{NumSector} I_{i,j} \cdot ChannelPower_{i,j} \quad (2)$$

There are six disposition patterns of the reference signals in downlink communication in LTE. Consequently, although interference occurs with a 1/6 probability in the serving sectors even in relation to RB that is not used in the other sector, there is no such interference in the present embodiment.

The PDCCH corresponding to the serving sector as described above includes REG that are used and REG that are not used. Furthermore in the same manner, the PDSCH corresponding to other sectors includes REG that are used and REG that are not used.

Figure 6:
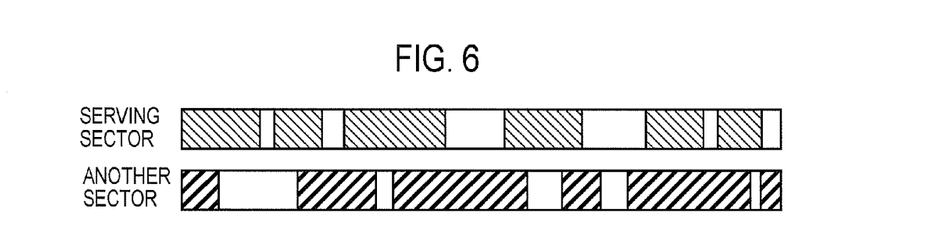
FIG. 6 is a diagram illustrating an example of a usage state of the PDCCH according to the embodiment of the present invention.

FIG. 6 is a diagram illustrating an example of the PDCCH usage state corresponding to another sector and the PDCCH usage state corresponding to the serving sector. When the PDCCH usage rate corresponding to the serving sector is denoted by a and the PDCCH usage rate corresponding to the other sector is denoted by B, the probability that the REG used in the PDCCH corresponding to the serving sector overlaps with the REG used in the PDCCH corresponding to the other sector, that is to say, the probability of the same frequency band when randomness is assumed to be sufficiently high takes a value of B irrespective of the value for a.

When the average power of the channel corresponding to all RBs in the j-th other sector (AverageChannelPower$_j$) and the PDCCH usage rate $B_j$ corresponding to the j-th other sector in addition to Equation (1) and Equation (2) are used, the PDSCH interference power I corresponding to the serving sector is given by Equation (3) below.

[Equation 3]

$$I = \sum_{j \ne ServingSector}^{NumSector} \beta_j(TxPower_j - PathLoss_j) \cdot \\ AverageChannelPower_j \\ = \sum_{j \ne ServingSector}^{NumSector} \beta_j \cdot InterferencePower_j \quad (3)$$

As illustrated in FIG. 2, the control unit 102 includes a W-CQI reception processing unit 152, a PDCCH usage rate acquisition unit 154, and a PDCCH quality estimation unit 156 in order to estimate the PDCCH quality corresponding to the serving sector.

The control unit 102 executes an estimation of the PDCCH quality corresponding to the serving sector using the calculation equation and the PDCCH quality corresponding to the serving sector using the offset value.

The following processing is executed when estimating the PDCCH quality corresponding to the serving sector by use of the calculation equation.

The radio terminal 2A measures the W-CQI that is the average PDSCH quality (Signal to Interference and Noise Ratio (SINR)) contained in the predetermined downlink radio resource corresponding to the serving sector. Then the radio terminal 2A transmits a measured W-CQI (measured W-CQI) message to the radio base station 1A.

The W-CQI reception processing unit 152 in the control unit 102 of the radio base station 1A receives the measured W-CQI message corresponding to the serving sector from the radio terminal 2A through the antenna 107 and the radio communication unit 105.

The PDCCH usage rate acquisition unit 154 in the control unit 102 acquires the PDCCH usage rate α corresponding to the historical serving sector.

More specifically, the PDCCH usage rate acquisition unit 154 specifies REG containing DCI for all REG in the PDCCH corresponding to the serving sector for each assignment of RB corresponding to the serving sector, and calculates the proportion of the REG domains containing DCI to the total REG domains in the PDCCH as the PDCCH usage rate α corresponding to the serving sector. Then the PDCCH usage rate acquisition unit 154 stores the calculated PDCCH usage rate α corresponding to the serving sector in the storage unit 103. Thereafter, the PDCCH usage rate acquisition unit 154 reads the PDCCH usage rate α corresponding to the serving sector stored in the storage unit 103 in order to estimate the PDCCH quality corresponding to the serving sector.

The PDCCH quality estimation unit 156 in the control unit 102 estimates the PDCCH reception quality (SINR) corresponding to the serving sector in the radio terminal 2A based on the measured W-CQI corresponding to the serving sector received by the W-CQI reception processing unit 152 and the PDCCH usage rate α corresponding to the historical serving sector read by the PDCCH usage rate acquisition unit 154.

The PDCCH quality estimation unit 156 may use an average value as the usage rate α when there is a plurality of PDCCH usage rates α corresponding to the historical serving sector read by the PDCCH usage rate acquisition unit 154.

More specifically, the SINR of the PDCCH corresponding to the serving sector is determined by Equation (4) below by using the PDCCH signal power (Signal Power) corresponding to the serving sector, the PDCCH interference power (InterferencePower) corresponding to the serving sector, and the noise power (Noise Power).

[Equation 4]

$$SINR = \frac{SignalPower}{InterferencePower + NoisePower} \quad (4)$$

Equation (5) below is obtained by substitution of Equation (3) into Equation (4).

[Equation 5]

$$SINR = \frac{SignalPower}{\sum_{j \neq ServingSector}^{NumSector} \beta_j InterferencePower_j + NoisePower} \quad (5)$$

In the present embodiment, when it is assumed that noise power (Noise Power) is sufficiently small to be ignored, Equation (5) may be rewritten as Equation (6) below.

[Equation 6]

$$SINR = \frac{SignalPower}{\sum_{j \neq ServingSector}^{NumSector} \beta_j InterferencePower_j} \quad (6)$$

The PDCCH usage rate $B_j$ corresponding to the j-th other sector is included in Equation (6). However, in the LTE standard, the radio base station 1A cannot directly acquire the PDCCH usage rate $B_j$ corresponding to the j-th other sector. In the present embodiment, in light of the large difference between sectors, it is generally assumed that the PDCCH usage rate is such that the PDCCH usage rate $B_j$ corresponding to the j-th other sector is equal to the PDCCH usage rate α corresponding to the historical serving sector. Using this assumption, Equation (6) can be rewritten as Equation (7) below.

[Equation 7]

$$SINR = \frac{SignalPower}{\sum_{j \neq ServingSector}^{NumSector} \alpha \cdot InterferencePower_j}$$

$$= \frac{SignalPower}{\sum_{j \neq ServingSector}^{NumSector} InterferencePower_j} \cdot \frac{1}{\alpha} \quad (7)$$

In light of the fact that generally all the PDSCH is used, the term on the right side of Equation (7) when 1/α is removed is the measured W-CQI corresponding to the serving sector when it is assumed that the PDSCH usage rate corresponding to the other sectors and the PDSCH usage rate corresponding to the serving sector both take a value of one. Therefore, the PDCCH quality estimation unit 156 can calculate the SINR of the estimation of the PDCCH that corresponds to the serving sector by substitution in Equation (7) of the measured W-CQI corresponding to the serving sector and the PDCCH usage rate α corresponding to the historical serving sector.

Equation (7) is shown in decibels.

[Equation 8]

$$Estim.SINR = SINR_{WCQI} - 10 \log(\alpha) \quad (8)$$

As used herein, Estim.SINR is the decibel value of the SINR of the estimation of the PDCCH corresponding to the serving sector, and $SINR_{WCQI}$ is the decibel value of the measured W-CQI corresponding to the serving sector.

When estimating the PDCCH quality corresponding to the serving sector using the offset value, the following processing is performed.

The difference between the SINR of the PDCCH corresponding to the serving sector calculated in advance by a numerical simulation and the measured W-CQI corresponding to the serving sector is stored as an offset value in the storage unit 103.

Figure 7:
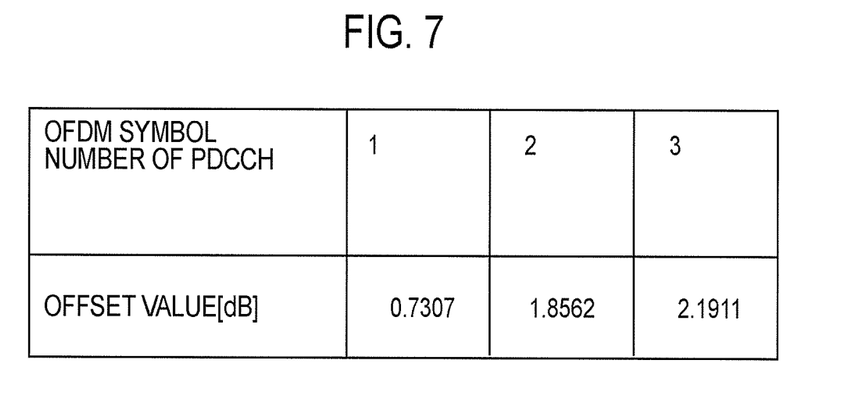
FIG. 7 is a table illustrating an example of an offset value according to the embodiment of the present invention.

FIG. 7 is a table illustrating an example of an offset value. The offset value illustrated in FIG. 7 is associated with the OFDM symbol number configuring the PDCCH domain that corresponds to the serving sector and is stored in the storage unit 103. The offset value increases as the number of corresponding OFDM symbols increases. The PDCCH usage rate corresponding to the serving sector and the other sector decreases as the number of OFDM symbols configuring the PDCCH domain corresponding to the serving sector increases. As a result, the SINR of the estimate for the PDCCH corresponding to the serving sector increases as clearly illustrated in Equation (7) and Equation (8).

The PDCCH quality estimation unit 156 specifies the number of OFDM symbols configuring the PDCCH domain corresponding to the serving sector, and reads the offset value corresponding to the OFMD symbol number from the storage unit 103.

The SINR calculation equation in the estimation of the PDCCH corresponding to the serving sector using the offset value (Offset) is shown in decibels in Equation (9).

[Equation 9]

$$Estim.SINR = SINR_{WCQI} + Offset \quad (9)$$

The PDCCH quality estimation unit 156 calculates in decibels the SINR of the estimation of the PDCCH corresponding to the serving sector by substituting the decibel value for measured W-CQI corresponding to the serving sector and the offset value read from the storage unit 103 into Equation (9).

(2) Operation of Radio Base Station

Figure 8:
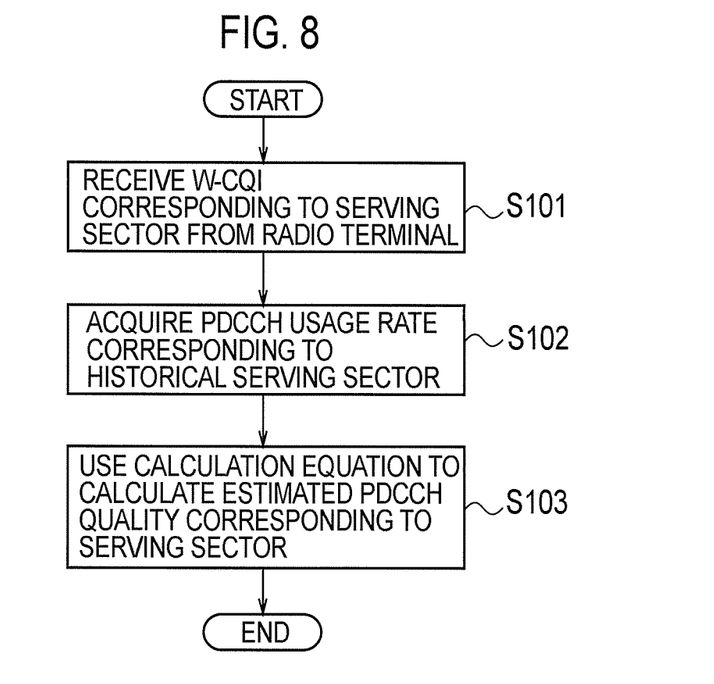
FIG. 8 is a flowchart showing the operation of the PDCCH quality estimation using a calculation equation in a radio base station according to the embodiment of the present invention.

FIG. 8 is a flowchart showing the operation of the PDCCH quality estimation using a calculation equation in the radio base station 1A.

In step S101, the control unit 102 in the radio base station 1A receives a measured W-CQI corresponding to the serving sector from the radio terminal 2A.

In step S102, the control unit 102 acquires the PDCCH usage rate α corresponding to the historical serving sector that is stored in the storage unit 103.

In step S103, the control unit 102 calculates an estimated PDCCH quality (SINR) corresponding to the serving sector based on the measured W-CQI corresponding to the serving sector and the PDCCH usage rate α corresponding to the historical serving sector using the calculation equation in Equation (7) or Equation (8).

Figure 9:
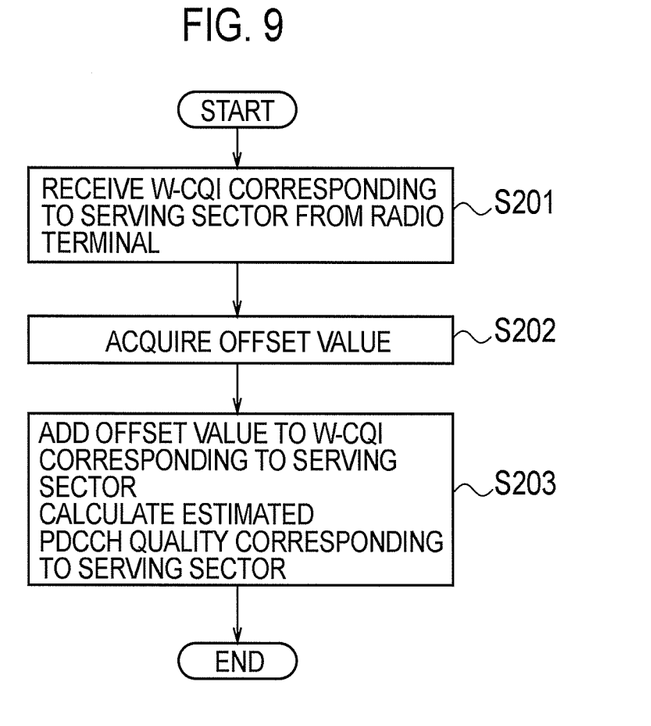
FIG. 9 is a flowchart showing the operation of the PDCCH quality estimation using an offset value in a radio base station according to the embodiment of the present invention.

FIG. 9 is a flowchart showing the operation of the PDCCH quality estimation using an offset value in a radio base station 1A.

In step S201, the control unit 102 in the radio base station 1A receives a measured W-CQI corresponding to the serving sector from the radio terminal 2A.

In step S202, the control unit 102 acquires the offset value that is stored in the storage unit 103.

In step S203, the control unit 102 adds the offset value and the measured W-CQI corresponding to the serving sector based on Equation (9), to thereby calculate the estimated PDCCH quality (SINR) corresponding to the serving sector.

(3) Operation and Effect

Figure 10:
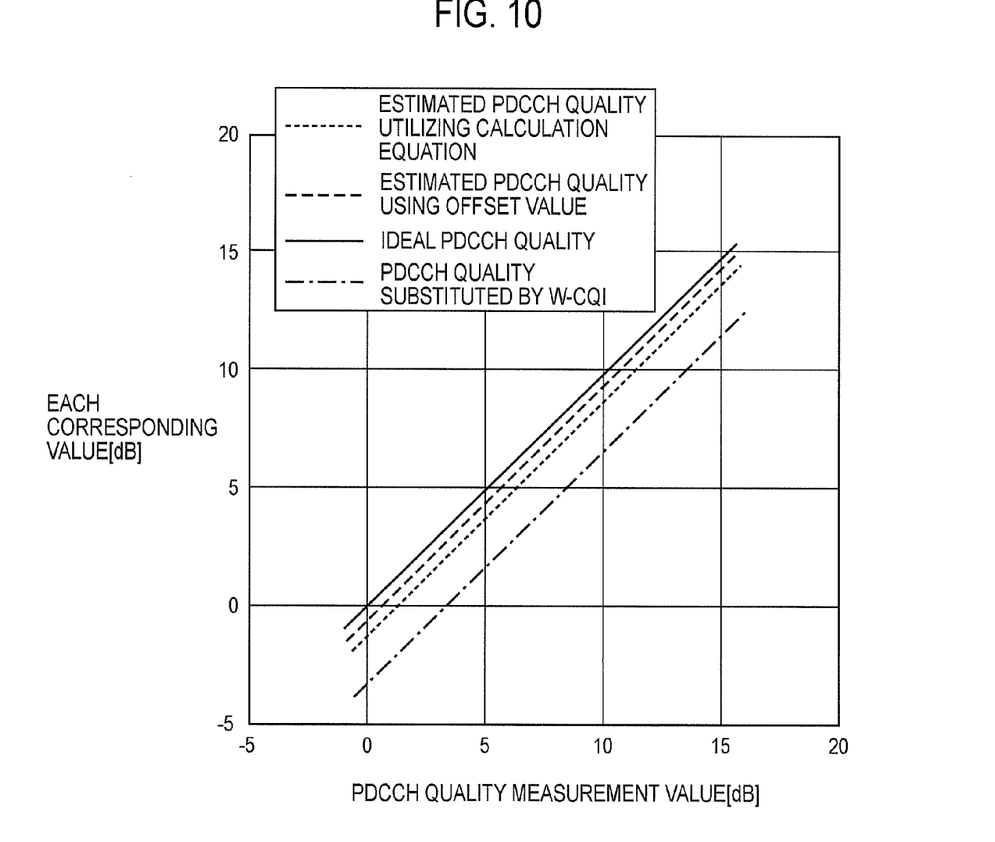
FIG. 10 is a graph illustrating the correspondence relationship among ideal PDCCH quality, the PDCCH quality substituted by W-CQI, the estimated PDCCH quality using a calculation equation, and the estimated PDCCH quality using an offset value.

FIG. 10 is a graph illustrating the correspondence relationship among the ideal PDCCH quality, the PDCCH quality substituted by W-CQI, the estimated PDCCH quality when using a calculation equation in Equation (7) or Equation (8) (estimated PDCCH quality using a calculation equation), and the estimated PDCCH quality when using an offset value (estimated PDCCH quality using an offset value).

As illustrated in FIG. 10, the estimated PDCCH quality using a calculation equation and the estimated PDCCH quality using an offset value in the present embodiment both take values that are closer to the ideal PDCCH quality than the PDCCH quality substituted by W-CQI that is originally used as the PDCCH corresponding to the serving sector. In other words, the estimated PDCCH quality using a calculation equation and the estimated PDCCH quality using an offset value are both more suitable estimation values for PDCCH than the values previously available.

Figure 11:
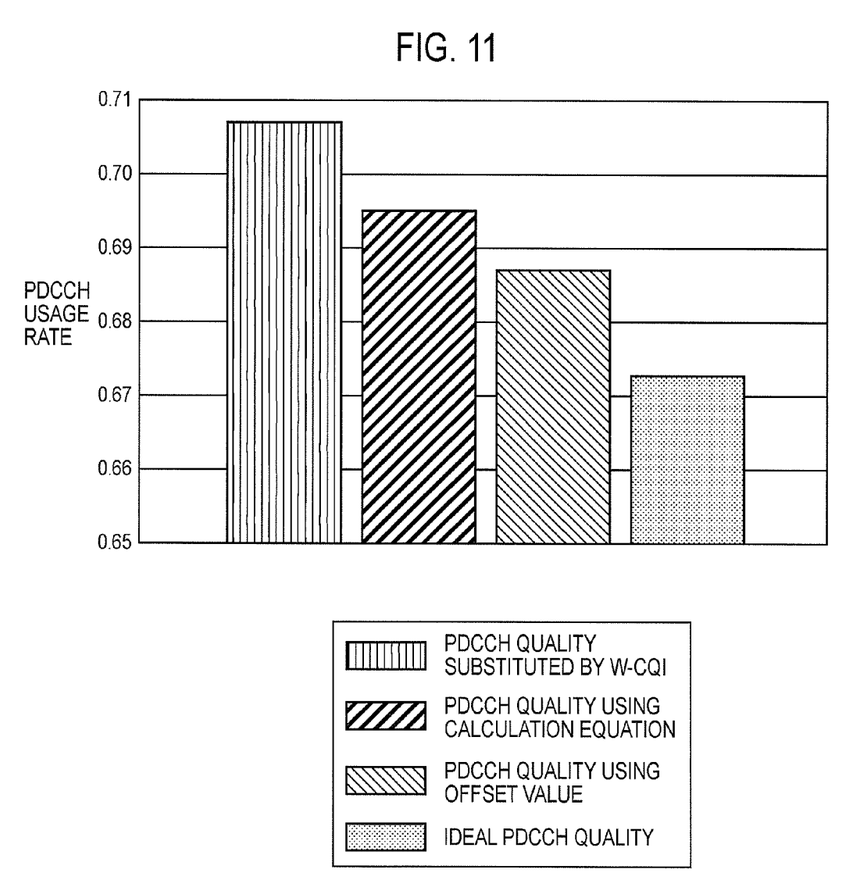
FIG. 11 is a graph illustrating the usage rate for the PDCCH respectively for the ideal PDCCH quality, the PDCCH quality substituted by W-CQI, the estimated PDCCH quality using a calculation equation, and the estimated PDCCH quality using an offset value.

FIG. 11 is a graph illustrating the usage rate for the PDCCH respectively for the ideal PDCCH quality, the PDCCH quality substituted by W-CQI, the estimated PDCCH quality using a calculation equation, and the estimated PDCCH quality using an offset value. As illustrated in FIG. 11, the usage rate for the PDCCH in the estimated PDCCH quality using a calculation equation and the estimated PDCCH quality using an offset value is closer to the usage rate for PDCCH in the ideal PDCCH quality than the usage rate for the PDCCH in the PDCCH quality substituted by W-CQI.

Figure 12:
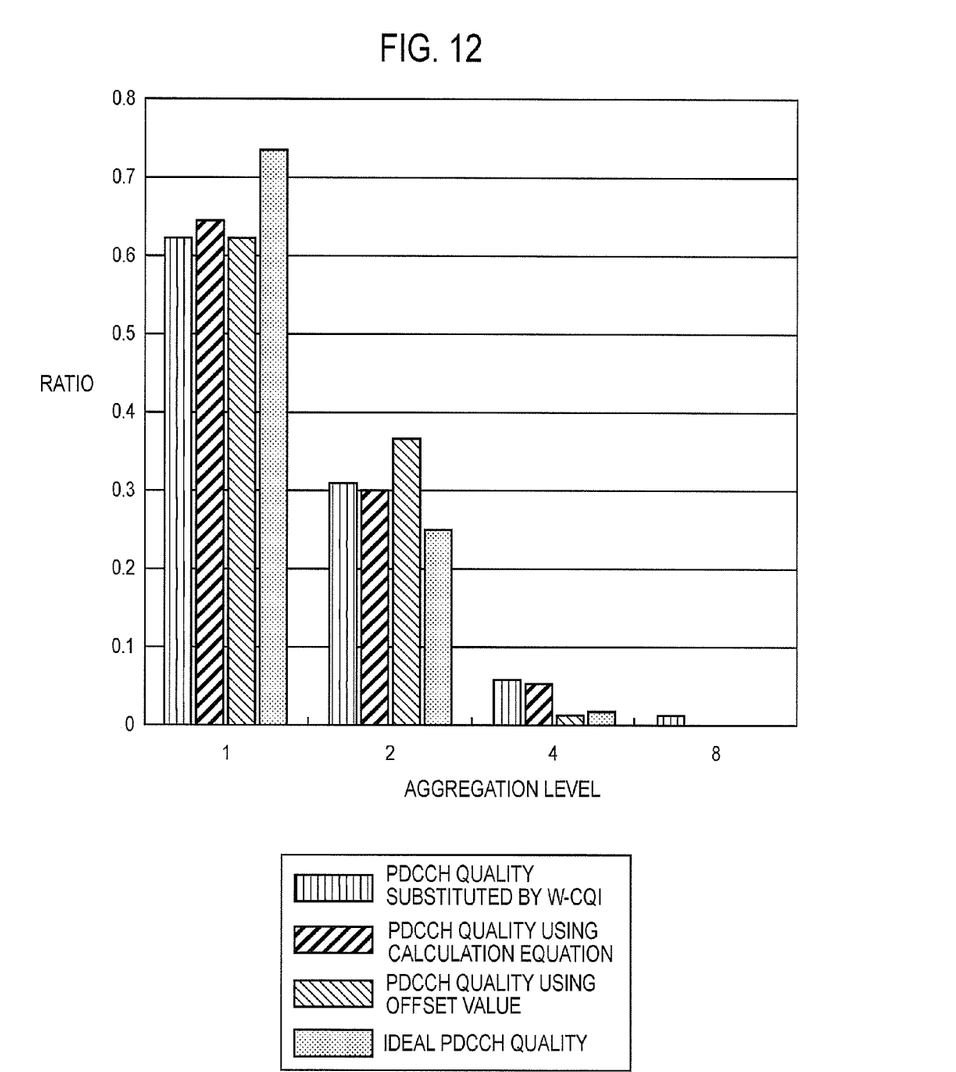
FIG. 12 is a graph illustrating an AL distribution respectively for the ideal PDCCH quality, the PDCCH quality substituted by W-CQI, the estimated PDCCH quality using a calculation equation, and the estimated PDCCH quality using an offset value.

FIG. 12 is a graph illustrating an AL distribution respectively for the ideal PDCCH quality, the PDCCH quality substituted by W-CQI, the estimated PDCCH quality using a calculation equation, and the estimated PDCCH quality using an offset value. As illustrated in FIG. 12, the AL distribution for the estimated PDCCH quality using a calculation equation and the estimated PDCCH quality using an offset value displaces more towards a small AL and is closer to the AL distribution in the ideal PDCCH quality than the AL distribution for the PDCCH quality substituted by W-CQI.

Figure 13:
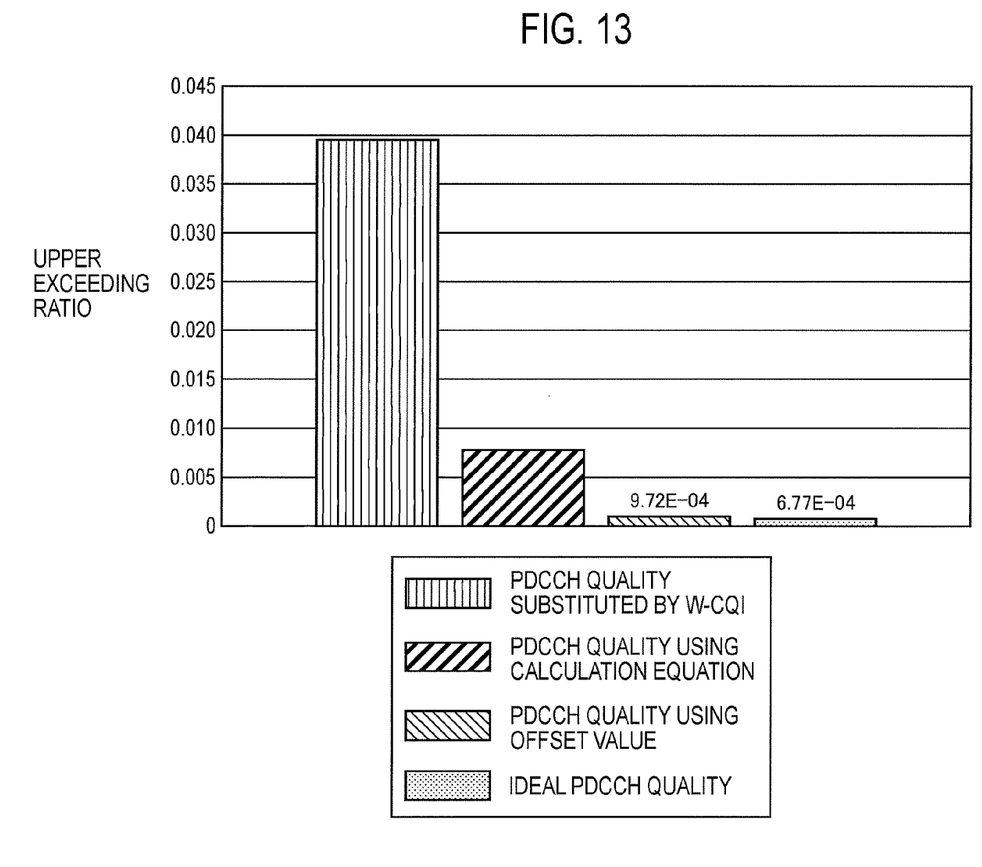
FIG. 13 is a graph illustrating an upper exceeding rate respectively for the ideal PDCCH quality, the PDCCH quality substituted by W-CQI, the estimated PDCCH quality using a calculation equation, and the estimated PDCCH quality using an offset value.

FIG. 13 is a graph illustrating a rate by which DCI is not included in PDCCH (upper exceeding rate) respectively for the ideal PDCCH quality, the PDCCH quality substituted by W-CQI, the estimated PDCCH quality using a calculation equation, and the estimated PDCCH quality using an offset value. As illustrated in FIG. 13, the upper exceeding rate in the estimated PDCCH quality using a calculation equation and the estimated PDCCH quality using an offset value is markedly lower than the upper exceeding rate for the PDCCH quality substituted by W-CQI, and is closer to the upper exceeding rate in the ideal PDCCH quality.

In this manner, the radio communication system 10 according to the present embodiment enables the radio base station 1A to acquire an estimation value that is closer to the ideal PDCCH quality than the conventional PDCCH quality substituted by W-CQI by obtaining the estimated PDCCH quality using a calculation equation or the estimated PDCCH quality using an offset value as an estimated PDCCH quality corresponding to the serving sector.

(4) Other Embodiments

Although the present invention has been described in relation to the embodiments above in relation to the estimated PDCCH quality using a calculation equation and the estimated PDCCH quality using an offset value, the description or drawings forming a part of this disclosure should not be understood as imposing a restriction on the invention. Furthermore, various substitutions, examples or operational techniques shall be apparent to a person skilled in the art based on this disclosure.

For example, in the above embodiments, although the cells 3A to 3C are divided into a plurality or sectors, the invention can be applied in the same manner without such division. In this case, in PDSCH and PDCCH corresponding to the cell 3A that is the serving cell provided by the radio base station 1A, interference results from the electrical power of PDSCH and PDCCH corresponding to the other cell that has the same frequency band as the serving cell. In response to this interference, the control unit 102 in the radio base station 1A obtains the estimated PDCCH quality using a calculation equation and the estimated PDCCH quality using an offset value corresponding to the serving cell instead of the estimated PDCCH quality using a calculation equation and the estimated PDCCH quality using an offset value corresponding to the serving sector as described above.

In the embodiments described above, although the radio communication system 10 has a configuration based on LTE, application of the invention is possible in the same manner to a configuration based on another communication scheme.

The present invention should be understood to encompass various embodiments that are not stated herein. Therefore, the present invention is limited only by the specific features of the invention in the scope of the patent claims reasonably evident from the disclosure above.

This application claims the benefit of Japanese Patent Application No. 2009-117076 (filed May 13, 2009), which is hereby incorporated by reference herein in its entirety.

INDUSTRIAL APPLICABILITY

The radio base station and the communication control method according to the present invention enable suitable estimation of a radio resource quality, and are useful as a communication control method.

The invention claimed is:

1. A radio base station in a radio communication system having a downlink radio resource including a user data channel and a control channel, the radio base station comprising:
a first acquisition unit configured to acquire information showing a reception quality of the user data channel received by the radio terminal in a predetermined cell or a predetermined sector;
a second acquisition unit configured to acquire a value determined according to a usage rate of the control channel corresponding to a cell other than the predetermined cell or a sector other than the predetermined sector; and
an estimation unit configured to estimate a reception quality of the control channel received by the radio terminal in the predetermined cell or the predetermined sector based on the information showing the communication quality of the user data channel acquired by the first acquisition unit and the value determined according to the usage rate of the control channel acquired by the second acquisition unit, wherein the second acquisition unit acquires an offset value being the difference between the reception quality of the control channel corresponding to the predetermined cell or the predetermined sector and the reception quality of the user data channel corresponding to the predetermined cell or the predetermined sector, and the estimation unit estimates the reception quality of the control channel received by the radio terminal in the predetermined cell or the predetermined sector by adding the offset value and the reception quality of the user data channel corresponding to the predetermined cell or the predetermined sector.

2. The radio base station according to claim 1 wherein the second acquisition unit acquires the usage rate of the control channel corresponding to the cell other than the predetermined cell or the sector other than the predetermined sector, and the estimation unit estimates the reception quality of the control channel received by the radio terminal in the predetermined cell or the predetermined sector by multiplying the reception quality of the user data channel corresponding to the predetermined cell or the predetermined sector by a reciprocal of the usage rate of the control channel corresponding to the other cell or the other sector.

3. The radio base station according to claim 2 wherein the estimation unit uses a usage rate of the user data channel corresponding to the predetermined cell or the predetermined sector as the usage rate of the user data channel corresponding to the other cell or the other sector.

4. The radio base station according to claim 1 wherein the offset value increases as the number of symbols configuring a control channel domain corresponding to the predetermined cell or the predetermined sector increases.

* * * * *